(12) United States Patent  (10) Patent No.: US 6,629,189 B1
Sandstrom et al.  (45) Date of Patent: Sep. 30, 2003

(54) METHOD AND APPARATUS FOR MANAGING TARGET DEVICES IN A MULTI-PATH COMPUTER SYSTEM

(75) Inventors: Harold Sandstrom, Belmont, MA (US); Khang Can, North Quincy, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/521,930

(22) Filed: Mar. 9, 2000

(51) Int. Cl.[7] .......................... G06F 12/00; G06F 12/10
(52) U.S. Cl. ........................ 711/4; 711/111; 711/209; 710/9; 710/38
(58) Field of Search ............................ 711/4, 111, 112, 711/114, 202, 161; 710/9, 15, 36, 38, 62–64, 100, 104, 305, 311, 312

(56) References Cited

U.S. PATENT DOCUMENTS 6,145,028 A  * 11/2000 Shank et al. .................. 710/31

OTHER PUBLICATIONS

Operating Systems—Design and Implementation, Andrew S. Tanenbaum, 1987, Prentice–Hall, pp. 276–277, 300.*

Linux Unlished, Tim Parker, 1998, Sams Publishing, Chapter 32.*

* cited by examiner

Primary Examiner—Matthew Kim
Assistant Examiner—Woo H. Choi
(74) Attorney, Agent, or Firm—Wolf, Greenfield & Sacks, P.C.

(57) ABSTRACT

A method and apparatus for managing at least one logical volume in a computer system that includes a processor, a storage system, and a plurality of paths coupling the processor to the storage system. The storage system stores a plurality of logical volumes that includes the at least one logical volume, and the at least one logical volume is accessible to the processor over at least two paths. The processor includes a mapping layer that assigns the logical volumes to store particular volumes of data. At least two distinct native names are created for the at least one logical volume, each native name corresponding to one of the paths over which the logical volume is accessible to the processor. A pseudoname is created for the distinct native names, and represents the at least one logical volume in a manner that is independent of the paths over which the logical volume is accessible to the processor. The pseudoname and the at least two native names each is made available to the mapping layer for assignment to store a volume of data, so that the mapping layer may assign the at least one logical volume to store a particular volume of data by assigning the pseudoname or either of the native names to store the particular volume of data.

42 Claims, 5 Drawing Sheets

# METHOD AND APPARATUS FOR MANAGING TARGET DEVICES IN A MULTI-PATH COMPUTER SYSTEM

FIELD OF THE INVENTION

The present invention is directed to a method and apparatus for managing access to target devices in a multi-path computer system.

DESCRIPTION OF THE RELATED ART

Many computer systems include one or more host computers, and one or more resources that include target devices accessible by the host computers. An example of a typical computer system resource is a storage system that stores data used by one or more of the host computers. An example of a computer system including a host computer 1 and a storage system 3 is shown in FIG. 1.

The storage system 3 includes a plurality of disk drives 5a–b, and a plurality of disk controllers 7a–7b that respectively control access to the disk drives 5a and 5b. The storage system 3 further includes a plurality of storage bus directors 9 that control communication with the host computer 1 over communication buses 17. The storage system 3 further includes a cache 11 to provide improved storage system performance. In particular, when the host computer 1 executes a read from the storage system 3, the storage system 3 may service the read from the cache 11 (when the data is stored in the cache), rather than from one of the disk drives 5a–5b, to execute the read more efficiently. Similarly, when the host computer 1 executes a write to the storage system 3, the corresponding storage bus director 9 can execute the write to the cache 11. Thereafter, the write can be destaged asynchronously, in a manner transparent to the host computer 1, to the appropriate one of the disk drives 5a–5b. Finally, the storage system 3 includes an internal bus 13 over which the storage bus directors 9, disk controllers 7a–7b and the cache 11 communicate.

The host computer 1 includes a processor 16 and one or more host bus adapters 15 that each controls communication between the processor 16 and the storage system 3 via a corresponding one of the communication buses 17. It should be appreciated that rather than a single processor 16, the host computer 1 can include multiple processors. Each bus 17 can be any of a number of different types of communication links, with the host bus adapter 15 and the storage bus directors 9 being adapted to communicate using an appropriate protocol for the communication bus 17 coupled therebetween. For example, each of the communication buses 17 can be implemented as a SCSI bus, with the directors 9 and adapters 15 each being a SCSI driver. Alternatively, communication between the host computer 1 and the storage system 3 can be performed over a Fibre Channel fabric.

As shown in the exemplary system of FIG. 1, some computer systems employ multiple paths for communicating between the host computer 1 and the storage system 3 (e.g., each path includes a host bus adapter 15, a bus 17 and a storage bus director 9 in FIG. 1). In many such systems, each of the host bus adapters 15 has the ability to access each of the disk drives 5a–b, through the appropriate storage bus director 9 and disk controller 7a–b. It should be appreciated that providing such multi-path capabilities enhances system performance, in that multiple communication operations between the host computer 1 and the storage system 3 can be performed simultaneously.

Although the provision of multiple paths between the host computer 1 and a system resource such as the storage system 3 provides for improved system performance, it also results in some increased system complexity. For example, some facility is typically required to enable the host computer 1 to recognize that multiple paths have been formed to the same storage devices within the storage system. Referring to the illustrative system of FIG. 1, the operating system on the host computer 1 typically will view the storage system 3 as having four times its actual number of disk drives 5a–b, since four separate paths are provided to each of disk drives 5a–b. Thus, one type of known multi-path system includes an additional mapping layer in the host computer 1, below the mapping layer (referred to hereafter as the "file system/ LVM layer") including the file system, logical volume manager (LVM) and/or database manager, to reduce the number of storage devices (e.g., disk drives 5a–b) visible at the file system/LVM layer to the number of storage devices that actually exist on the storage system 3.

FIG. 2 is a schematic representation of a number of mapping layers that may exist in such a known multi-path computer system. The system includes an application layer 21 which includes application programs executing on the processor 16 of the host computer 1. The application layer 21 generally will refer to storage locations used thereby with a label or identifier such as a file name, and will have no knowledge about where the file is physically stored on the storage system 3 (FIG. 1). Below the application layer 21 is the file system/LVM layer 23 that maps the label or identifier specified by the application layer 21 to a logical volume that the host computer perceives to correspond directly to a physical device address (e.g., the address of one of the disk drives 5a–b) within the storage system 3. Below the file system/LVM layer 23 is a multi-path mapping layer 25 that maps the logical volume address specified by the file system/ LVM layer 23, through a particular one of the multiple system paths, to the logical volume address to be presented to the storage system 3. Thus, the multi-path mapping layer 25 not only specifies a particular logical volume address, but also specifies a particular one of the multiple system paths to access the specified logical volume.

If the storage system 3 were not an intelligent storage system, the logical volume address specified by the multi-path layer 25 would identify a particular physical device (e.g., one of disk drives 5a–b) within the storage system 3. However, for an intelligent storage system such as that shown in FIG. 1, the storage system itself may include a further mapping layer 27, such that the logical volume address passed from the host computer 1 may not correspond directly to an actual physical device (e.g., a disk drive 5a–b) on the storage system 3. Rather, a logical volume specified by the host computer 1 can be spread across multiple physical storage devices (e.g., disk drives 5a–b), or multiple logical volumes accessed by the host computer 1 can be stored on a single physical storage device.

It should be appreciated from the foregoing that the multi-path mapping layer 25 performs two functions. First, it controls which of the multiple system paths is used for each access by the host computer 1 to a logical volume. Second, the multi-path mapping layer 25 also reduces the number of logical volumes visible to the file system/LVM layer 23. In particular, for a system including X paths between the host computer 1 and the storage system 3, and Y logical volumes defined on the storage system 3, the host bus adapters 15 see X times Y logical volumes. However, the multi-path mapping layer 25 reduces the number of logical volumes visible to the file system/LVM layer 23 to equal only the Y distinct logical volumes that actually exist on the storage system 3.

FIG. 3 is a conceptual representation of the manner in which the multi-path mapping layer 25 reduces the number of logical volumes visible to the file system/LVM layer 23 in the computer system of FIG. 1, which includes four paths labeled P1–P4. In the example shown in FIG. 3, the storage system 3 includes twenty logical volumes 51, labeled LV1–LV20. The host computer 1 includes four separate labels 53–56 (referred to herein as "native names") for each of logical volumes LV1–LV20. These native names are identified conceptually in FIG. 3 as P1LV1–P1LV20, P2LV1–P2LV20, P3LV1–P3LV20 and P4LV1–P4LV20, to indicate that there are four separate paths (i.e., P1–P4) to each of the groups of logical volumes LV1–LV20. Finally, the multi-path mapping layer 25 (FIG. 2) consolidates the four groups of labels 53–56 to provide only twenty unique labels 59 (referred to herein as "pseudonames" and labeled PLV1–PLV20) corresponding respectively to logical volumes LV1–LV20, so that the file system/LVM layer 23 sees the correct number of logical volumes actually defined on the storage system 3.

In a multi-path system as described above in connection with FIG. 3, the operating system executing on the host computer 1 is required to manage (e.g., at the multi-path mapping layer 25) a number of logical volume native names that is equal to the number of logical volumes defined on the storage system 3 (Y in the example above), multiplied by the number of paths (e.g., X in the example above and four in FIG. 1) between the host computer 1 and the storage system 3. Referring to the illustrative system of FIG. 1, assuming the storage system 3 includes a total of twenty disk drives 5a–b that each corresponds directly to a single logical volume, and with the system including four paths 17 between the host computer 1 and the storage system 3, the operating system on the processor 16 would need to manage eighty logical volume native names. In this respect, a unique native name is generated for each independent path to a logical volume. Thus, for each of the twenty logical volumes present on the storage system 3, four unique native names will be generated, each specifying a different path (e.g., through an adapter 15, a bus 17 and a director 9) to the logical volume. These unique native names are used during multi-path operation to identify which of the multiple system paths is to be used to execute an operation on the host computer 1 directed to a particular logical volume.

A second type of known multi-path computer system does not employ pseudonames 59 as described above in connection with FIG. 3. Rather, the file system/LVM mapping layer 23 accesses one of the logical volumes 51 in the storage system 3 by referring to one of the native names 53–56 corresponding thereto. The multi-path mapping layer 25 maintains information that establishes the logical connection among the native names 53–56, to enable the use of multiple paths. For example, if access is sought by the file system/LVM layer 23 to native name P1LV1, the multi-path mapping layer 25 will recognize that the identified logical volume in the storage system 3 (i.e., LV1) can be accessed by any of native names P1LV1, P2LV1, P3LV1 or P4LV1. Therefore, while only a single native name will be specified by the file system/LVM layer 23, the multi-path mapping layer 25 will not be constrained to use the identified path, and may select any of the multiple system paths P1–P4 for accessing the specified logical volume in the storage system 3.

SUMMARY OF THE INVENTION

One illustrative embodiment of the present invention is directed to a method of managing at least one logical volume in a computer system. The computer system includes a processor, a storage system, and a plurality of paths coupling the processor to the storage system. The storage system stores a plurality of logical volumes that includes the at least one logical volume, the at least one logical volume being accessible to the processor over at least two of the plurality of paths. The processor includes a mapping layer that assigns the plurality of logical volumes to store particular volumes of data, the mapping layer including to at least one of a file system, a logical volume manager and a database manager. The method comprises acts of: (A) adopting at least two distinct native names for the at least one logical volume, each of the native names corresponding to one of the at least two of the plurality of paths over which the at least one logical volume is accessible to the processor; (B) adopting a pseudoname for the at least two distinct native names, the pseudoname representing the at is least one logical volume in a manner that is independent of the at least two of the plurality of paths over which the at least one logical volume is accessible to the processor; and (C) making the pseudoname and the at least two native names available to the mapping layer for assignment to store a volume of data, so that the mapping layer may assign the at least one logical volume to store a particular volume of data by assigning the pseudoname or either of the at least two native names to store the particular volume of data.

Another illustrative embodiment of the invention is directed to a computer readable medium encoded with a program for execution on a computer system including a processor, a storage system, and a plurality of paths coupling the processor to the storage system. The storage system stores a plurality of logical volumes. The processor includes a mapping layer that assigns the plurality of logical volumes to store particular volumes of data, the mapping layer including at least one of a file system, a logical volume manager and a database manager. The plurality of logical volumes includes at least one logical volume that is accessible to the processor over at least two of the plurality of paths. The program, when executed on the computer system, performs a method comprising acts of: (A) adopting at least two distinct native names for the at least one logical volume, each of the native names corresponding to one of the at least two of the plurality of paths over which the at least one logical volume is accessible to the processor; (B) adopting a pseudoname for the at least two distinct native names, the pseudoname representing the at least one logical volume in a manner that is independent of the at least two of the plurality of paths over which the at least one logical volume is accessible to the processor; and (C) making the pseudoname and the at least two native names available to the mapping layer for assignment to store a volume of data, so that the mapping layer may assign the at least one logical volume to store a particular volume of data by assigning the pseudoname or either of the at least two native names to store the particular volume of data.

A further illustrative embodiment of the invention is directed to a host computer for use in a computer system including the host computer, a storage and a plurality of paths coupling the host computer to the storage system. The storage system stores a plurality of logical volumes, the plurality of logical volumes including at least one logical volume that is accessible to the host computer over at least two of the plurality of paths. The host computer comprises: a mapping layer that assigns the plurality of logical volumes to store particular volumes of data, the mapping layer including at least one of a file system, a logical volume manager and a database manager; and at least one controller.

The at least one controller adopts at least two distinct native names for the at least one logical volume, each of the native names corresponding to one of the at least two of the plurality of paths over which the at least one logical volume is accessible to the host computer. The at least one controller further adopts a pseudoname for the at least two distinct native names, the pseudoname representing the at least one logical volume in a manner that is independent of the at least two of the plurality of paths over which the at least one logical volume is accessible to the host computer. The at least one controller further makes the pseudoname and the at least two native names available to the mapping layer for assignment to store a volume of data, so that the mapping layer may assign the at least one logical volume to store a particular volume of data by assigning the pseudoname or either of the at least two native names to store the particular volume of data.

A further embodiment of the invention is directed to a method of managing at least one system resource in a computer system, the computer system including a processor, a device, and a plurality of paths coupling the processor to the device. The at least one system resource is accessible to the processor over at least two of the plurality of paths. The device includes a plurality of system resources including the at least one system resource. The processor includes a mapping layer that assigns the plurality of system resources to perform particular tasks. The method comprises acts of: (A) creating at least two distinct native names for the at least one system resource, each of the native names corresponding to one of the at least two of the plurality of paths over which the at least one system resource is accessible to the processor; (B) creating a pseudoname for the at least two distinct native names, the pseudoname representing the at least one system resource in a manner that is independent of the at least two of the plurality of paths over which the at least one system resource is accessible to the processor; and (C) making the pseudoname and the at least two native names available to the mapping layer for assignment to perform a task, so that the mapping layer may assign the at least one system resource to perform a particular task by assigning the pseudoname or either of the at least two native names to perform the particular task.

Another illustrative embodiment of the invention is directed to a method of managing a plurality of logical volumes in a computer system, the computer system including a processor, a storage system, and a plurality of paths coupling the processor to the storage system. The processor includes a mapping layer including at least first and second mapping entities that each assigns at least a subset of the plurality of logical volumes to store particular volumes of data. The mapping layer includes at least one of a file system, a logical volume manager and a database manager. Each of the plurality of logical volumes is accessible to the processor over at least two of the plurality of paths. Each one of the plurality of logical volumes has a corresponding set of native names including a distinct native name for each of the plurality of paths over which the one of the plurality of logical volumes is accessible to the processor. Each set of native names has a pseudoname that represents the corresponding logical volume in a manner that is independent of any of the plurality of paths over which the corresponding logical volume is accessible to the processor. The sets of native names collectively form a plurality of native names that represent the plurality of logical volumes, and the pseudonames for the sets of native names collectively form a plurality of pseudonames that represent the plurality of logical volumes. The method comprises acts of: (A) the first mapping entity assigning a first subset of the plurality of logical volumes to store a first group of volumes of data by assigning at least some of the plurality of pseudonames to store the first group of volumes of data; and (B) the second mapping entity assigning a second subset of the plurality of logical volumes to store a second group of volumes of data by assigning at least some of the plurality of native names to store the second group of volumes of data.

A further illustrative embodiment of the invention is directed to a host computer for use in a computer system including the host computer, a storage system, and a plurality of paths coupling the host computer to the storage system. The storage system stores the plurality of logical volumes. Each of the plurality of logical volumes is accessible to the host computer over at least two of the plurality of paths. Each one of the plurality of logical volumes has a corresponding set of native names including a distinct native name for each of the plurality of paths over which the one of the plurality of logical volumes is accessible to the host computer. Each set of native names has a pseudoname that represents the corresponding logical volume in a manner that is independent of any of the plurality of paths over which the corresponding logical volume is accessible to the host computer. The sets of native names collectively form a plurality of native names that represent the plurality of logical volumes. The pseudonames for the sets of native names collectively form a plurality of pseudonames that represent the plurality of logical volumes. The host computer comprises a mapping layer including at least first and second mapping entities that each assigns at least a subset of the plurality of logical volumes to store particular volumes of data, the first and second mapping entities each including one of a file system, a logical volume manager and a database manager. The first mapping entity assigns a first subset of the plurality of logical volumes to store a first group of volumes of data by assigning at least some of the plurality of pseudonames to store the first group of volumes of data, and the second mapping entity assigns a second subset of the plurality of logical volumes to store a second group of volumes of data by assigning at least some of the plurality of native names to store the second group of volumes of data.

DETAILED DESCRIPTION

Figure 1:
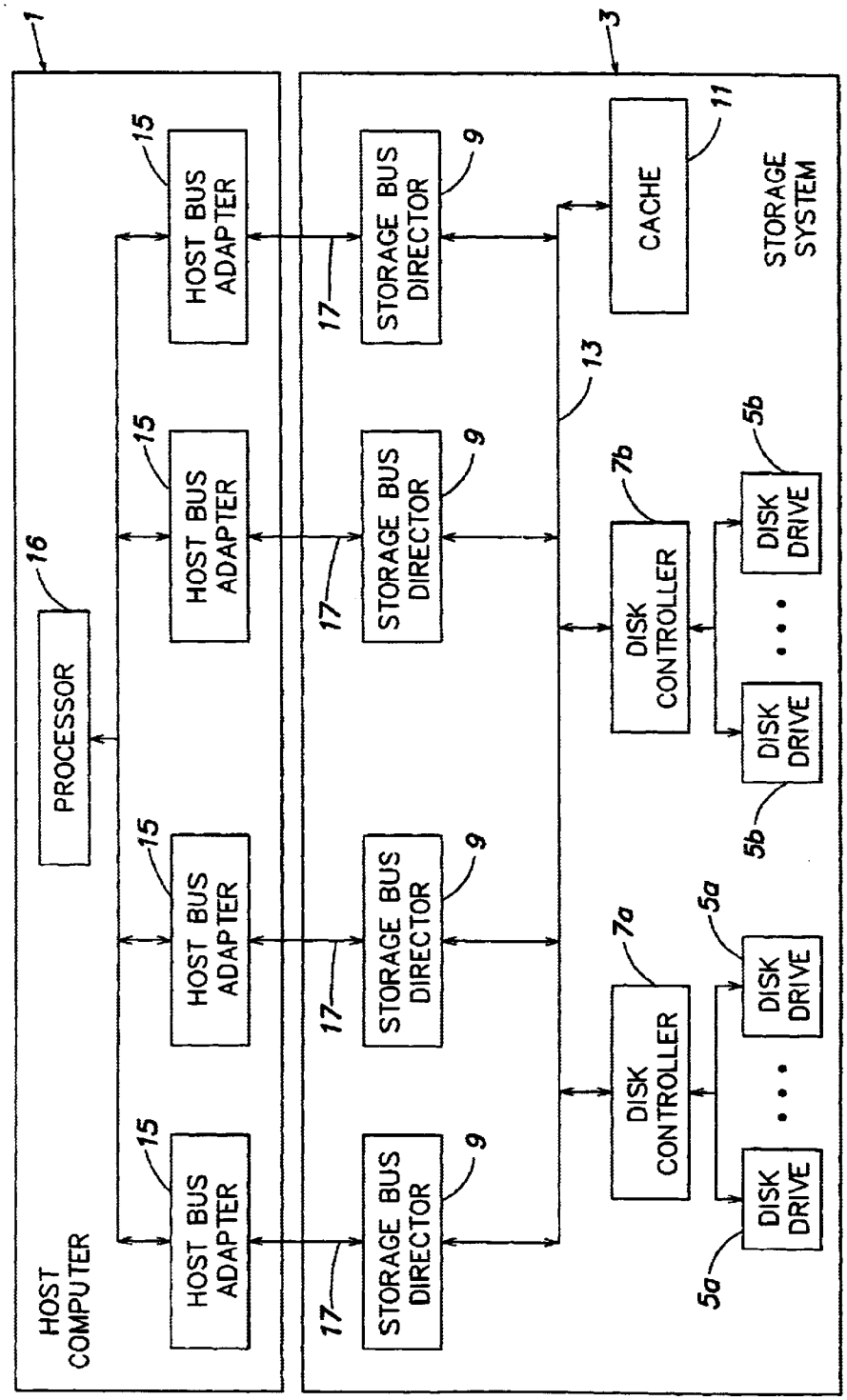
FIG. 1 is a block diagram of an illustrative multi-path computing system on which aspects of the present invention can be implemented.

Applicants have discovered that each of the two above-described multi-path systems has disadvantages. Thus, in accordance with one illustrative embodiment of the present invention, an improved method and apparatus for implementing a multi-path computer system is provided. In one embodiment of the present invention, layers above the multi-path mapping layer (e.g., the file system/LVM layer 23) are provided with access to both the native names for resources available over multiple paths, as well as pseudonames that each provides a single identifier for a resource available over multiple paths. As a result, all of the advantages of each of the known types of multi-path systems is maintained, while the disadvantages of each is overcome.

In the examples discussed below, the aspects of the present invention are described in connection with a storage system that includes a plurality of disk drives. However, it should be appreciated that the present invention is not limited in this respect. The present invention can be employed with any type of storage system (e.g., tape drives, etc.) and is not limited to use with a disk drive storage system. Furthermore, the present invention also can be employed in a multi-path computer system wherein a host computer accesses different types of system resources (i.e., other than storage devices) over multiple paths. Therefore, the aspects of the present invention discussed below can be employed with a multi-path computer system employing multiple paths between a host computer and any type of computer system resource.

While the known type of multi-path computer system described above in connection with FIG. 3 works well, it has one disadvantage. In this respect, it should be appreciated that in that system, the name that the file system/LVM layer 23 uses to access a particular one of the logical volumes 51 in the storage system 3 (i.e., LV1–LV20) is selected from one of the pseudonames 59 provided by the multi-path mapping layer 25. Applicants have recognized that while the presentation of pseudonames 59 to the file system/LVM mapping layer 23 provides a number of advantages discussed below, it presents a disadvantage in connection with systems that were initially configured so that the file system/LVM layer 23 directly accessed the logical volume native names 53–56 to reach one of the logical volumes 51 in the storage system 3. Such systems can include, for example, systems that previously employed only a single path to communicate can include, for example, systems that previously employed only a single path to communicate between the host computer 1 and the storage system 3, or multi-path systems wherein the multi-path layer 25 presents native names 53–56 to the file system LVM layer 23. To convert either of such systems to one that employs pseudonames 59, modifications must be made to the file system/LVM layer 23. In this respect, the file system/LVM layer 23 must be modified so that it no longer refers to native names 53–56 when referencing a logical volume, but rather, refers to the pseudonames 59 recognized by the multi-path mapping layer 25. Applicants have recognized that such a conversion can be extremely time consuming and expensive for some computer system configurations. In fact, for some systems, the conversion cost can be so high that it negates the advantages that would be achieved by employing pseudonames, or even those that would be achieved by converting from a single-path to a multi-path system. Therefore, Applicants have appreciated that it is desirable to provide a multi-path system that provides an alternative that does not require existing configurations to convert the file system/LVM layer 23 to the use of pseudonames 59.

Figure 2:
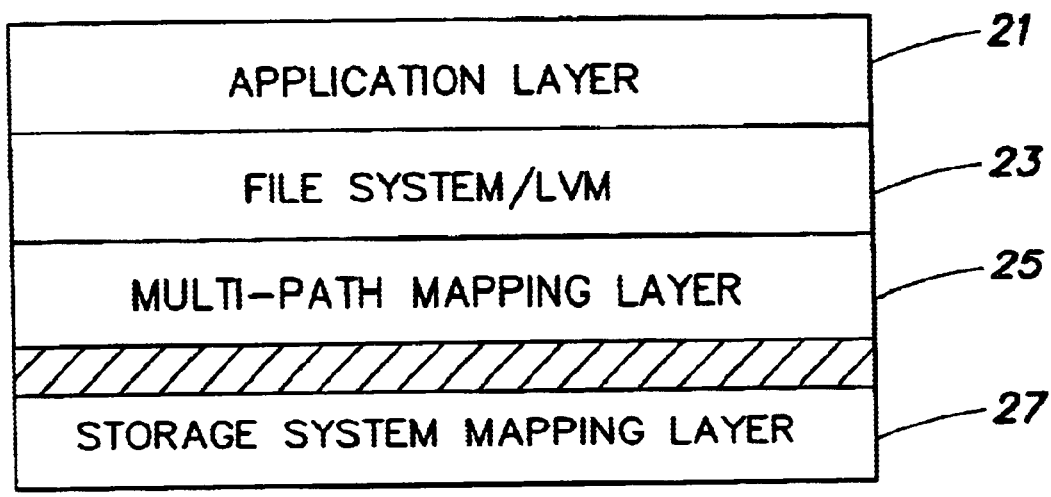
FIG. 2 is a schematic representation of a number of mapping layers that exist in the multi-path computing system of FIG. 1.
Figure 3:
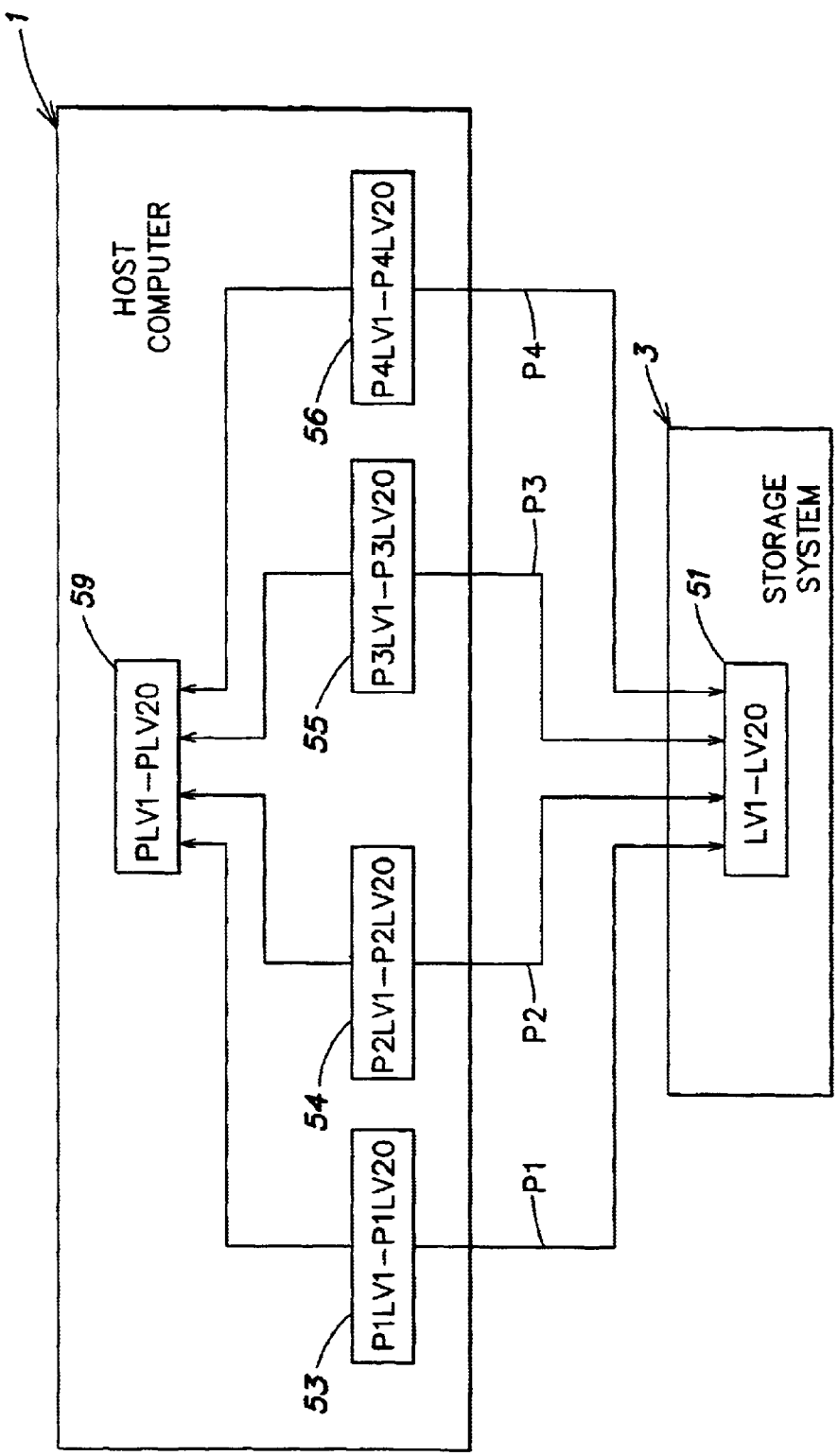
FIG. 3 is a conceptual illustration of the manner in which logical volumes are managed in a prior art multi-path computing system employing pseudonames.

It should be appreciated that the above-discussed conventional multi-path system that provides the file system/LVM mapping layer 23 with access to the native names 53–56 does not have the same disadvantages as the pseudoname system of FIG. 3. Nevertheless, this system suffers from two different disadvantages. First, the presentation of native names 53–56 to the file system/LVM layer 23 masks the fact that two or more of the native names identify the same resource (e.g., a logical volume) rather than different resources. This can be a problem if the entities in the file system/LVM layer 23 do not have the capability of determining which of the native names identify a common resource. For example, in the embodiment wherein the resource is a storage system 3 as shown in FIGS. 1—3, it would be problematic if the file system/LVM mapping layer 23 were unable to determine that two native names (e.g., P1LV1 and P2LV1) identify the same logical volume. In this respect, one of the functions performed by the file system/LVM layer 23 is to assign the logical volumes presented by the multi-path mapping layer 25 to store particular volumes of data. If the file system/LVM layer 23 were unable to recognize that P1LV1 and P2LV2 were the same logical volume, the file system/LVM layer 23 could assign those native names to store different volumes of data, thereby enabling programs running in the application layer 21 to write different volumes of data to the same location, which can result in a loss of data.

As far as Applicants are aware, this problem has been avoided in systems that make native names available to the file system/LVM layer 23 by implementing such a system only when all of the entities in the file system/LVM layer 23 are "path aware", such that they are capable of determining which native names identify the same target resource. This identification can be done in a number of ways as discussed further below. However, it should be appreciated that not all mapping entities that potentially can be provided in the file system/LVM layer 23 are path aware, such that this can place a significant restriction on the types of systems on with which the multi-path capability can be provided using this conventional technique.

The second disadvantage to conventional systems that make the native names 53–56 directly available to the file system/LVM layer 23 relates to the ease with which the system can be reconfigured. In this respect, the native names 53–56 identify not only a particular logical volume within the storage system 3, but also a particular path (including the relevant ports on the host computer 1 and the storage system 3) by which the logical volume is accessed, and as such, are dependent upon the physical configuration of the computer system. For example, for a SCSI connection, each native name may constitute a device identifier such as "/dev/dsk/$c_0t_0d_0$", which refers to a logical volume accessible at channel zero ($c_0$) (which can be any of the multiple paths in FIG. 1), and having a target number zero ($t_0$) and logical unit number (LUN) zero ($d_0$).

It should be appreciated from the foregoing that providing the file system/LVM layer with access to the native names 53–56 means that when the system is reconfigured, the file system/LVM layer 23 must be modified to reflect the new system configuration. For example, when the system is initially configured, particular native names will be assigned to the entities in the file system/LVM layer 23, and the entities within the layer 23 will use each native name consistently to refer to a particular logical volume. If the physical configuration of the system is subsequently changed so that particular logical volumes 51 in the storage system 3 are identified by new configuration-specific native names, the entities in the file system/LVM layer 23 will need to be updated to reflect the new native names that must be used to access the relevant logical volumes. An example of how the system can be reconfigured includes the removing of one of the paths P1–P4 (FIG. 3) between the host computer 1 and the storage system 3. For example, referring to FIG. 3, if the native name for the logical volume LV1 accessed by the file system/LVM mapping layer 23 specified path P1, and then path P1 was removed, the file system/LVM mapping layer 23 would need to be reconfigured to maintain access to the logical volume LV1. In this respect, while paths P2–P4 still are available for the host computer 1 to access the logical volume LV1 in the storage system 3, the native name P1LV1 recognized by the file system/LVM mapping layer 23 to access the logical volume would no longer identify logical volume LV1. It should be appreciated that if any significant configuration changes are made to the system, the manual updating required for the entities (e.g., file systems, logical volume managers, databases, etc.) in the file system/LVM layer 23 can be significant.

As discussed above, in one embodiment of the present invention, both native names and pseudonames are made visible to the file system/LVM layer 23. In this manner, the host computer 1 can be customized so that the entities in the file system/LVM mapping layer 23 can refer to either the pseudonames or native names, whichever is preferable for a particular situation.

Figure 4:
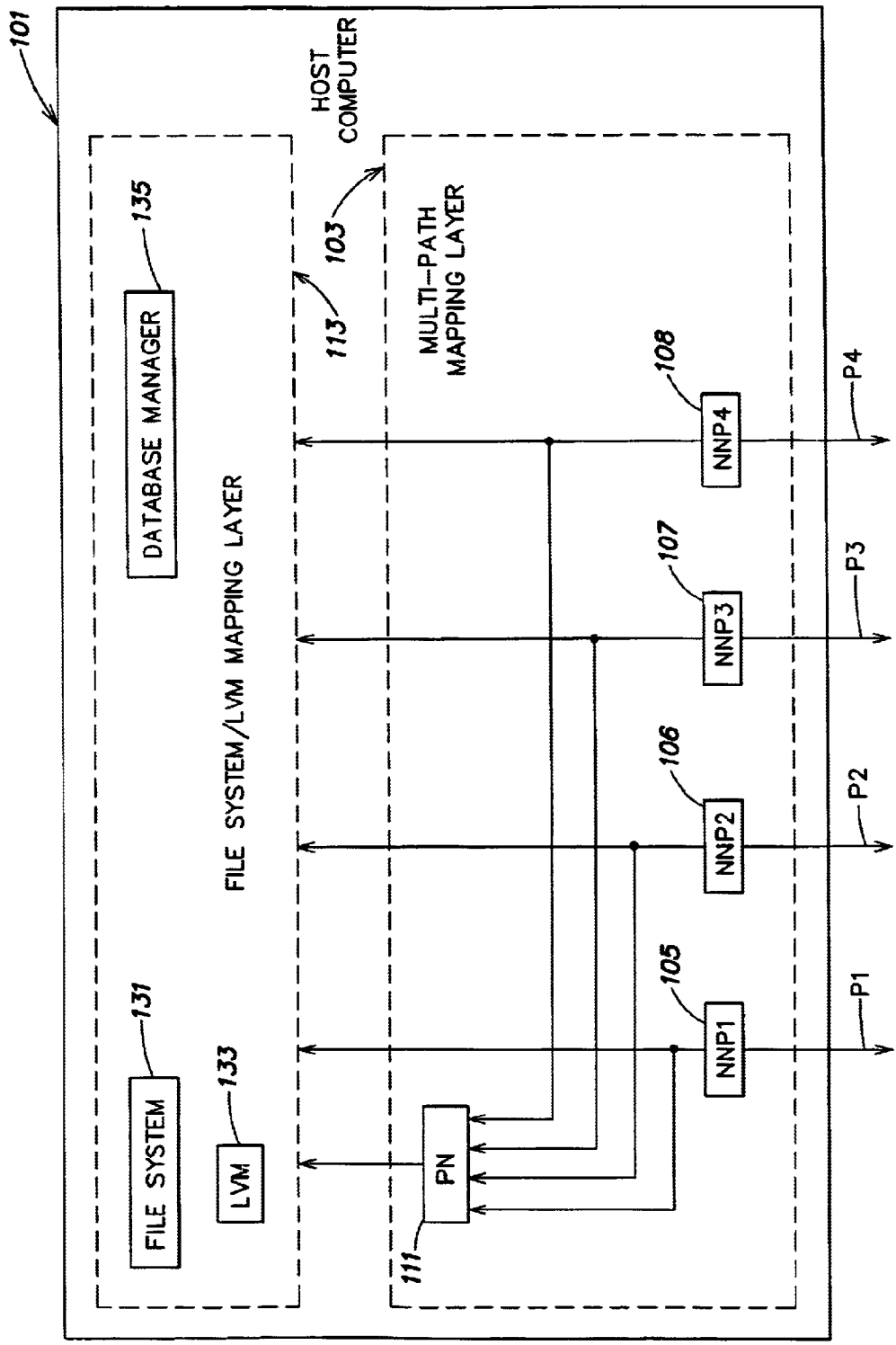
FIG. 4 is a conceptual illustration of the manner in which logical volumes are managed in accordance with one embodiment of the present invention that employs both pseudonames and native names.

This illustrative embodiment of the present invention is shown conceptually in FIG. 4, which illustrates a host computer 101 that is similar in most respects to the host computer 1 shown in FIG. 1, but that employs a different type of multi-path mapping layer 103. The host computer 101 includes four paths P1–P4 for communicating with a system resource such as the storage system 3 (FIG. 1). In FIG. 4, a single logical volume is represented as being accessible over each of the paths P1–P4, and is designated with four distinct native names 105–108, with native name 105 being labeled NNP1 to designate that it is the native name for path P1 , native name 106 being designated NNP2 to designate that it is the native name for path P2, etc. In addition, the multi-path mapping layer 103 also creates a single pseudoname 111 for the logical volume, in much the same manner as discussed above in connection with FIG. 3. However, in contrast to the system shown in FIG. 3, in addition to making the pseudoname 111 accessible to the file system/LVM mapping layer 113, the multi-path mapping layer 103 also makes each of the native names 105–108 accessible to the file system/LVM mapping layer as well, as shown conceptually in FIG. 4. Thus, the multi-path mapping layer 103 adopts native names 105–108 for the logical volume, and also adopts a pseudoname 111 for the native names 105–108. As used herein, the term "adopt" can refer to the multi-path mapping layer actually creating the name (e.g., with the pseudoname 111), or to the multi-path mapping layer simply passing along a name (e.g., one of the native names 105–108) created by another entity.

It should be appreciated that providing the multi-path mapping layer 103 with the capability of making both pseudonames and native names available to the file system/LVM mapping layer 113 provides a number of advantages as compared with either of the prior art systems discussed above. For example, for systems on which one or more entities in the file system/LVM mapping layer 113 are to be newly installed, or for systems in which the time and effort is considered to be warranted to convert existing entities in the file system/LVM mapping layer 113 to access pseudonames, all of the advantages of employing pseudonames can be enjoyed.

For example, one advantage of employing pseudonames is that a pseudoname provides a single identifier for a logical volume accessible over multiple paths. Therefore, a pseudoname can be presented to entities in the file system/LVM mapping layer 113 that are not path aware, without the above-discussed concerns of a non-path aware entity inconsistently using two native names that in fact refer to the same logical volume in the storage system 3 (FIG. 1). For example, in the example of FIG. 4, wherein the mapping layer 113 includes multiple entities (i.e., file system 131, LVM 133 and database manager 135), some may be path-aware and others not. Furthermore, another advantage of pseudonames 111 is that they can be selected to be independent of the physical configuration of the system, thereby facilitating system reconfiguration.

For example, one advantage of employing pseudonames is that a pseudoname provides a single identifier for a logical volume accessible over multiple paths. Therefore, a pseudoname can be presented to entities in the file system/LVM mapping layer 113 that are not path aware, without the above-discussed concerns of a non-path aware entity inconsistently using two native names that in fact refer to the same logical volume in the storage system 3 (FIG. 1). For example, in the example of FIG. 4, wherein the mapping layer 113 includes entities 131, 133 and 135, some may be path-aware and others not. Furthermore, another advantage of pseudonames 111 is that they can be selected to be independent of the physical configuration of the system, thereby facilitating system reconfiguration.

Pseudonames can be implemented in any of numerous ways, as the present invention is not limited to any particular implementation. However, in one embodiment of the present invention, pseudonames are implemented via the multi-path mapping layer 103, which can provide a pseudoname for every system resource accessible by the host computer 101 (e.g., each logical volume from the storage system 3). For example, when the storage system is from the SYMMETRIX line of disk arrays available from EMC Corporation, Hopkinton, Mass., each logical volume is assigned a unique identifier by the storage system 3. This identifier is independent of the path used to access the logical volume, and as such, is independent of the physical configuration of the system. Thus, in one embodiment of the present invention, the multi-path mapping layer 103 can employ such an identifier to uniquely identify each of the logical volumes. The multi-path mapping layer 103 further includes metadata that maps from each pseudoname 111 provided for a particular logical volume to the native names 105–108 that identify the paths through which the logical volume can be accessed. Thus, as discussed above, when a change is made to the physical configuration of the system, no change is made to the pseudonames 111, so that no change need be made to the file system/LVM mapping layer 113. Rather, the metadata within the multi-path mapping layer 103 can be modified (e.g., by a system administrator) to reflect any changes to the mapping between the pseudonames and the native names that correspond thereto. It should be appreciated that this is a significantly easier task than modifying the file system/LVM mapping layer 113, where the metadata for a number of different entities in the mapping layer 113 may need to be modified.

As discussed above, while the use of pseudonames 111 can provide significant advantages, it may be desirable in some circumstances for one or more entities in the file system/LVM mapping layer 113 to access native names 105–108 directly, so that significant time and effort need not be expended to reconfigure those entities in the file system/LVM mapping layer 113 to access pseudonames. Therefore, in the embodiment of the invention shown in FIG. 4, the multi-path mapping layer 103 also enables native names 105–108 to be directly visible to the file system/LVM mapping layer 113. This can be done in any of numerous ways, as the present invention is not limited to any particular implementation.

Figure 5:
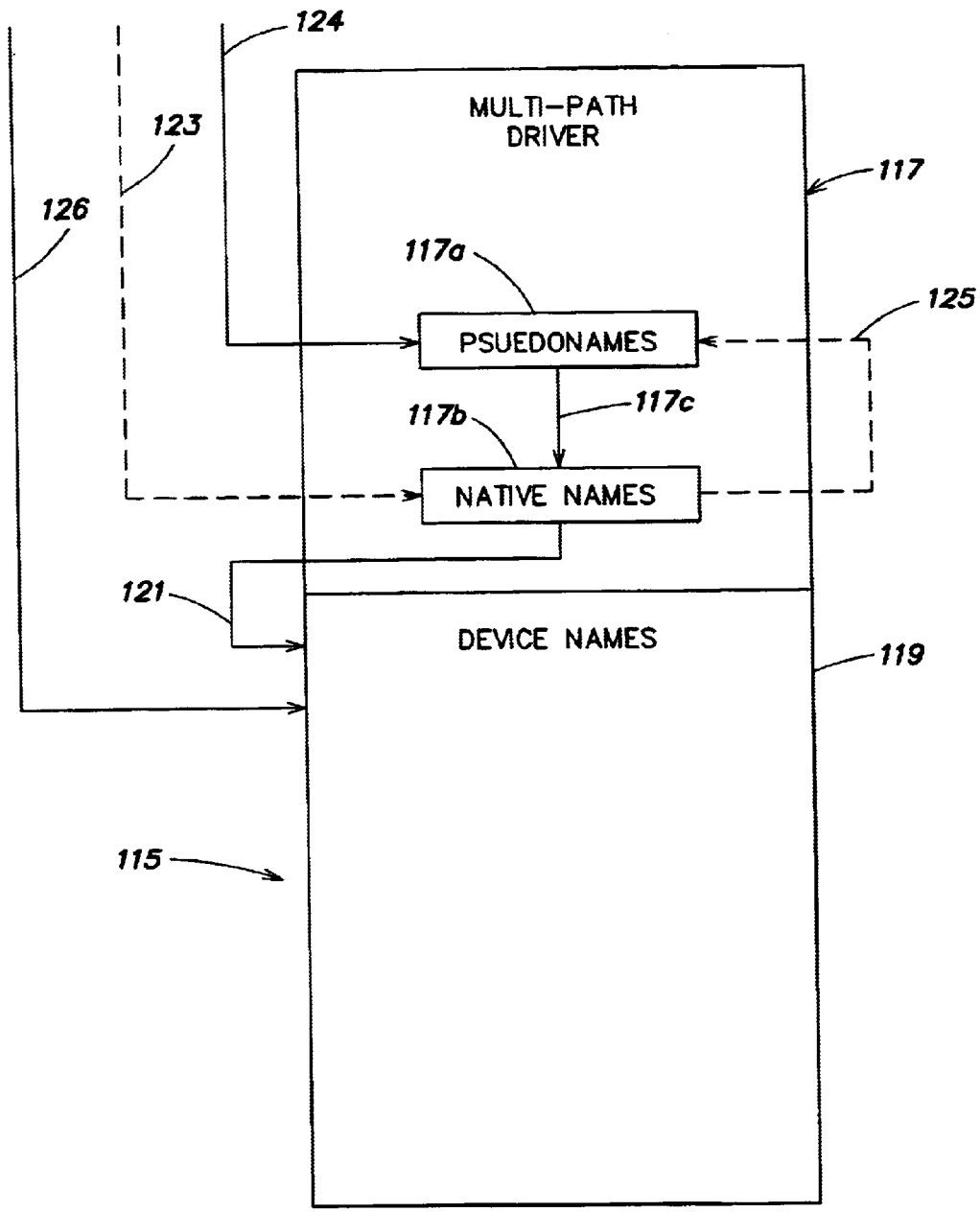
FIG. 5 is a schematic representation of the I/O stack in accordance with one illustrative embodiment of the present invention.

One illustrative implementation for enabling both pseudonames and native names to be visible to the file system/LVM mapping layer 113 is shown in FIG. 5, which conceptually illustrates the I/O stack 115 in the host computer 101 of FIG. 4. The I/O stack 115 receives I/O commands passed from the application layer 21 (FIG. 2) through the file system/LVM layer 113, and includes a multi-path driver 117 and a group of device drivers 119. The device drivers 119 are the lowest level in the I/O stack, and control physical devices (e.g., the host bus adapters 15 in FIG. 1) to implement the passing of I/O commands between the host computer 101 and a system resource such as the storage system 3 shown in FIG. 1.

The multi-path driver 117 implements the multi-path capabilities of the multi-path mapping layer 103 on the host computer 101, and includes two entry points 117a and 117b. The entry point 117a enables the multi-path driver 117 to respond to I/O commands from the file system/LVM layer 23 that are directed to pseudonames (represented in FIG. 5 by arrow 124). When it receives an I/O command accessing a pseudoname, the multi-path driver 117 selects one of the physical paths P1–P4 to service the I/O command by routing the I/O command to the appropriate one of the native names 105–108 (FIG. 4), as evidenced by the arrow 117c in FIG. 5. The selection of which of the paths P1–P4 (FIG. 4) to employ can be done in any of numerous ways (e.g., using a load balancing technique), as the present invention is not limited to any particular path selection technique. Once a particular path is selected, the I/O command is passed to the appropriate one of the device drivers 119, as indicated by the arrow 121 in FIG. 5.

The entry point 117b to the multi-path driver 117 corresponds to I/O operations from the file system/LVM layer 113 directly specifying a native name, as represented by dotted line 123 in FIG. 5. The multi-path driver 117 can handle such I/O operations in any of numerous ways. In one embodiment of the present invention, such I/O operations are handled to take advantage of the multi-path capabilities of the host computer 101 (FIG. 4). This can be done in any of numerous ways, as the present invention is not limited to any particular implementation. In one embodiment illustrated by the dotted line 125 in FIG. 5, requests directed to a particular native name are modified by the multi-path driver to be directed to the pseudoname 111 that corresponds to the native name. It should be appreciated that the multi-path driver 117 includes information correlating each pseudoname to the native names that correspond thereto, such that the multi-path driver 117 can use this information to determine how an I/O operation should be modified to refer to a particular pseudoname. The request then can be routed back to the entry point 117a for the multi-path driver, to be treated like a request directed to the pseudoname. Thus, the I/O operation will be handled in the manner discussed above. Of course, it should be appreciated that other implementations are possible to utilize the multi-path capability of the system, as the I/O operation directed to a native name can be handled differently by the multi-path driver, to take advantage of the multi-path capability of the system without returning to the entry point 117a dedicated to handling I/O operations directed to pseudonames.

As discussed above, it is possible for changes to be made to the physical configuration of the computer system that will result in the elimination of a particular native name (e.g., if a particular path that was used in defining a native name when the system was configured is later eliminated). In accordance with one embodiment of the invention, even if a native name is removed, the multi-path driver 117 can still handle requests from the file system/LVM layer 113 directed to that native name. As mentioned above, the multi-path driver can store information that specifies the correlation between a pseudoname and its corresponding native names. When a native name becomes extinct (i.e., no longer valid), the information in the multi-path driver 117 can still identify the pseudoname that corresponds to the extinct native name, such that an I/O request to an extinct native name can be routed back to the entry point 117a, and then can be serviced by one of the remaining native name paths that is still available to access the targeted logical volume in the storage system 3.

The handling of I/O requests from the file system/LVM layer 113 directly to particular native names introduces an additional level of complexity. As discussed above, some entities in the file system/LVM mapping layer 113 may be path aware, such that they will recognize that two or more native names (e.g., NNP1–NNP4) actually correspond to the same logical volume within the storage system 3 (FIG. 1), and will not attempt to use two related native names in an inconsistent manner. However, some entities in the file system/LVM mapping layer 113 may not be path aware.

In accordance with one illustrative embodiment of the present invention, it is desirable to enable entities in the file system/LVM mapping layer 113 which are not path aware to still have the capability of directly accessing native names 105–108 (FIG. 4), to achieve the advantages outlined above. In accordance with this embodiment of the invention, a technique is employed to prevent mapping entities that are not path aware from using multiple native names in an inconsistent manner. Although advantageous, it should be appreciated that the present invention is not limited in this respect, as the capability of providing direct access to native names alternatively can be employed only in connection with path aware entities in the file system/LVM mapping layer 113.

Non-path aware entities within the file system/LVM mapping layer 113 can be prevented from using multiple native names 105–108 in an inconsistent manner in any of numerous ways, as the present invention is not limited to any particular way of achieving this result. In one embodiment of the invention, some native names can be hidden from the non-path aware entities within the mapping layer 113. This can be done numerous ways, as the present invention is not limited to any particular implementation. In one embodiment, the hiding of one or more of the native names 105–108 is done by enabling non-path aware entities within the file system/LVM mapping layer 113 to only access one of a group of native names 105–108 that shares a common pseudoname 111. For example, if a non-path aware entity within the file system/LVM mapping layer 113 initially allocated native name 106 to a particular logical volume, one embodiment of the present invention would prevent any non-path aware entity in the file system/LVM mapping layer 113 from allocating any of the native names 105 and 107–108 to a different logical volume. This can be done, for example, by disabling any access to the native names 105 and 107–108 from a non-path aware entity. For example, when an I/O operation is passed from a non-path aware entity in the file system/LVM mapping layer 113 to the multi-path driver 117 and is targeting a native name that shares a pseudoname 111 with a native name that has already been assigned, the multi-path driver can simply cause the I/O operation to fail when it attempts to open the logical volume. As a result, the file system/LVM mapping layer 113 will be forced to reallocate a different native name to the targeted logical volume. Thus, this embodiment of the present invention ensures that for any group of native names that shares a pseudoname 111, the native names will not be assigned inconsistently in the file system/LVM mapping layer 113. Of course, since path aware entities have sufficient intelligence to not use two native names inconsistently, I/O operations received from a path aware entity in the file system/LVM layer 113 can simply be processed normally, without hiding any native names therefrom.

The identification of the entities in the file system/LVM mapping layer 113 that are path aware can be done in any of numerous ways. For example, the multi-path driver 117 can be provided (e.g., by a system administrator) with a list of entities in the file system/LVM mapping layer 113 that are not path aware. As will be well understood by those skilled in the art, an I/O operation passing through the multi-path driver 117 will include information (e.g., in the process block) that identifies the entity in the file system/LVM mapping layer that has assigned the targeted logical volume. Thus, the multi-path driver 117 can use the information provided by the system administrator to determine whether to hide one or more of the native names 105–108 from the requesting entity in the file system/LVM mapping layer 113. Of course, it should be appreciated that rather than providing the multi-path driver 117 with a list of non-path aware entities in the file system/LVM mapping layer 113, the multi-path driver 117 can be provided with a list of the entities that are path aware, so that none of the native names 105–108 will be hidden from those entities.

It should be appreciated that the embodiment of the present invention discussed above in connection with FIG. 5 is extremely flexible in terms of enabling access to native names and providing multi-path capability. The ability to employ any of the multiple paths P1–P4 (FIG. 4) in response to a direct access to one of the native names 105–108 can also be simply disabled by removing the pointer at the entry point 117b that causes such requests to be directed (as shown by the dotted line 125 in FIG. 5) to the corresponding pseudoname 111. Furthermore, the multi-path driver 117 can be bypassed altogether by removing the entry points 117a and 117b, such that accesses to a particular native name can be made directly from the file system/LVM mapping layer 113 to the device drivers 119 (as represented by the arrow 126 in FIG. 5). In addition, the multi-path driver 117 can also be configured to selectively disable the multi-path capability for identified logical volumes, such that the multi-path driver 117 can accept I/O operations directed to a particular native name 105–108 and simply pass such I/O operations through using the particular one of the multiple paths P1–P4 specified by the native name.

The above-described embodiments of the present invention can be implemented in numerous ways, as the present invention is not limited to any particular manner of implementation. For example, the functions performed by the multi-path driver 117 and multi-path layer 103 can be implemented within the processor 16 (FIG. 1) in the host computer 101. Alternatively, the multi-path driver can be implemented elsewhere in the host computer 101. It should be appreciated that any single component or collection of multiple components of the host computer 101 that perform the functions described above can be generically considered as one or more controllers that control the functions performed by the multi-path driver. The one or more controllers that perform the aspects of the present invention can be implemented in numerous ways, such as with dedicated hardware, or using a processor that is programmed using microcode or software to perform the functions recited above. In this respect, it should be appreciated that one implementation of the present invention comprises a computer readable medium (e.g., a computer memory, a floppy disk, a compact disk, a tape, etc.) encoded with a computer program that, when executed on a processor, performs the above-discussed functions of the present invention. The computer readable medium can be transportable such that the program stored thereon can be loaded onto the host computer or other computer system resource to implement the aspects of the present invention discussed above. In addition, it should be appreciated that the reference to a computer program that, when executed, performs the above-discussed functions is not limited to an application program running in application space on the host computer. Rather, the term computer program is used here in a generic sense to reference any type of computer code (e.g., software or microcode) that can be employed to program a processor to implement the above-discussed aspects of the present invention. The programmed processor can be the processor 16 (FIG. 1), or can be one or more special purpose processors (in the host bus adapters 15 or elsewhere) capable of performing functions relating to the passing of I/O operations between the host computer 101 and a system resource.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of managing at least one logical volume in a computer system, the computer system including a processor, a storage system, and a plurality of paths coupling the processor to the storage system, the storage system storing a plurality of logical volumes that includes the at least one logical volume, the at least one logical volume being accessible to the processor over at least two of the plurality of paths, the processor including a first mapping layer that assigns the plurality of logical volumes to store particular volumes of data by assigning logical volume identifiers to store the particular volumes of data, the first mapping layer including at least one of a file system, a logical volume manager and a database manager, the processor further including a multi-path mapping layer that can accept an input/output (I/O) request from the first mapping layer to access the at least one logical volume and select one of the at least two of the plurality of paths to process the request, wherein the I/O request from the first mapping layer identifies the at least one logical volume using a corresponding logical volume identifier, the method comprising acts of:

(A) adopting at least two distinct native names as logical volume identifiers for the at least one logical volume, each of the native names corresponding to one of the at least two of the plurality of paths over which the at least one logical volume is accessible to the processor;

(B) adopting at least one pseudoname as a logical volume identifier for the at least two distinct native names, the at least one pseudoname representing the at least one logical volume in a manner that is independent of the at least two of the plurality of paths over which the at least one logical volume is accessible to the processor; and (C) making the at least one pseudoname and the at least two native names directly available to the first mapping layer for assignment to store a volume of data, so that the first mapping layer can assign the at least one logical volume to store a particular volume of data by:

assigning the at least one pseudoname to store the particular volume of data so that I/O requests from the first mapping layer to access the at least one logical volume identify the at least one logical volume using the at least one pseudoname; or assigning either of the at least two native names to store the particular volume of data so that I/O requests from the first mapping layer to access the at least one logical volume identify the at least one logical volume using either of the at least two native names.

2. The method of claim 1, wherein the act (B) includes an act of adopting a single pseudoname for the at least two distinct native names.

3. The method of claim 1, wherein the first mapping layer includes at least one non-path aware entity that is incapable of determining that the at least two native names correspond to a same logical volume, and wherein the act (C) includes an act of making the at least two native names available to the at least one non-path aware entity for assignment to store a volume of data.

4. The method of claim 1, wherein the act (B) includes an act of adopting a pseudoname that identifies the at least one logical volume in a manner that is independent of a physical configuration of the computer system.

5. The method of claim 1, wherein the act (A) includes an act of adopting a plurality of native names, the plurality of native names including a set of distinct native names for each of the plurality of logical volumes that is accessible to the processor over multiple paths, wherein the act (B) includes an act of adopting a plurality of pseudonames, the plurality of pseudonames including a pseudoname for each set of distinct native names, wherein the first mapping layer includes at least first and second mapping entities, and wherein the method further includes acts of:

the first mapping entity assigning a first subset of the plurality of logical volumes to store a first group of volumes of data by assigning at least some of the plurality of pseudonames to store the first group of volumes of data; and the second mapping entity assigning a second subset of the plurality of logical volumes to store a second group of volumes of data by assigning at least some of the plurality of native names to store the second group of volumes of data.

6. The method of claim 1, further including, in response to the computer system being reconfigured so that the at least one logical volume is no longer available over one of the at least two paths, an act of:

continuing to make available to the first mapping layer the native name corresponding to the one of the at least two paths over which the at least one logical volume is no longer available.

7. The method of claim 1, further including an act of:

routing an input/output (I/O) command directed to the at least one pseudoname from the processor to the storage system over one of the at least two paths.

8. The method of claim 1, wherein the at least two distinct native names include a first native name corresponding to a first of the at least two paths and a second native name corresponding to a second of the at least two paths, and wherein the method further includes an act of:

routing an input/output (I/O) command directed to the first native name from the processor to the storage system over the second of the at least two paths.

9. The method of claim 1, wherein the act (A) includes an act of adopting a logical connection between the at least two distinct native names, the logical connection identifying the at least two distinct native names as corresponding to a same logical volume.

10. The method of claim 9, further including an act of:

(D) preventing the first mapping layer from assigning the at least two distinct native names to store different volumes of data.

11. The method of claim 10, wherein the act (D) includes an act of, in response to the first mapping layer assigning a first of the at least two distinct native names to store a particular volume of data, making the other native names that correspond to the same logical volume as the first of the at least two distinct native names unavailable for assignment by non-path aware entities in the first mapping layer.

12. A computer readable medium encoded with a program for execution on a computer system including a processor, a storage system, and a plurality of paths coupling the processor to the storage system, the storage system storing a plurality of logical volumes, the processor including a first mapping layer that assigns the plurality of logical volumes to store particular volumes of data by assigning logical volume identifiers to store the particular volumes of data, the first mapping layer including at least one of a file system, a logical volume manager and a database manager, the processor further including a multi-path mapping layer that can accept an input/output (I/O) request from the first mapping layer to access the at least one logical volume and select one of the at least two of the plurality of paths to process the I/O request, wherein the I/O request from the first mapping layer identifies the at least one logical volume using a corresponding logical volume identifier, the plurality of logical volumes including at least one logical volume that is accessible to the processor over at least two of the plurality of paths, the program, when executed on the computer system, performs a method comprising acts of:

(A) adopting at least two distinct native names as logical identifiers for the at least one logical volume, each of the native names corresponding to one of the at least two of the plurality of paths over which the at least one logical volume is accessible to the processor;

(B) adopting at least one pseudoname as a logical volume identifier for the at least two distinct native names, the at least one pseudoname representing the at least one logical volume in a manner that is independent of the at least two of the plurality of paths over which the at least one logical volume is accessible to the processor; and (C) making the at least one pseudoname and the at least two native names directly available to the first mapping layer for assignment to store a volume of data, so that the first mapping layer can assign the at least one logical volume to store a particular volume of data by:

assigning the at least one pseudoname to store the particular volume of data so that I/O requests from the first mapping layer to access the at least one logical volume identify the at least one logical volume using the at least one pseudoname or assigning either of the at least two native names to store the particular volume of data so that I/O requests from the first mapping layer to access the at least one logical volume identify the at least one logical volume using either of the at least two native names.

13. The computer readable medium of claim 12, wherein the act (B) includes an act of adopting a single pseudoname for the at least two distinct native names.

14. The computer readable medium of claim 12, wherein the first mapping layer includes at least one non-path aware entity that is incapable of determining that the at least two native names correspond to a same logical volume, and wherein the act (C) includes an act of making the at least two native names available to the at least one non-path aware entity for assignment to store a volume of data.

15. The computer readable medium of claim 12, wherein the act (B) includes an act of adopting a pseudoname that identifies the at least one logical volume in a manner that is independent of a physical configuration of the computer system.

16. The computer readable medium of claim 12, wherein the act (A) includes an act of adopting a plurality of native names, the plurality of native names including a set of distinct native names for each of the plurality of logical volumes that is accessible to the processor over multiple paths, wherein the act (B) includes an act of adopting a plurality of pseudonames, the plurality of pseudonames including a pseudoname for each set of distinct native names, wherein the first mapping layer includes at least first and second mapping entities, and wherein the method further includes acts of:

the first mapping entity assigning a first subset of the plurality of logical volumes to store a first group of volumes of data by assigning at least some of the plurality of pseudonames to store the first group of volumes of data; and the second mapping entity assigning a second subset of the plurality of logical volumes to store a second group of volumes of data by assigning at least some of the plurality of native names to store the second group of volumes of data.

17. The computer readable medium of claim 12, wherein the method further includes, in response to the computer system being reconfigured so that the at least one logical volume is no longer available over one of the at least two paths, an act of:

continuing to make available to the first mapping layer the native name corresponding to the one of the at least two paths over which the at least one logical volume is no longer available.

18. The computer readable medium of claim 12, wherein the method further includes an act of:

routing an input/output (I/O) command directed to the at least one pseudoname from the processor to the storage system over one of the at least two paths.

19. The computer readable medium of claim 12, wherein the at least two distinct native names include a first native name corresponding to a first of the at least two paths and a second native name corresponding to a second of the at least two paths, and wherein the method further includes an act of:

routing an input/output (I/O) command directed to the first native name from the processor to the storage system over the second of the at least two paths.

20. The computer readable medium of claim 12, wherein the act (A) includes an act of adopting a logical connection between the at least two distinct native names, the logical connection identifying the at least two distinct native names as corresponding to a same logical volume.

21. The computer readable medium of claim 20, wherein the method further includes an act of:

(D) preventing the first mapping layer from assigning the at least two distinct native names to store different volumes of data.

22. The computer readable medium of claim 21, wherein the act (D) includes an act of, in response to the first mapping layer assigning a first of the at least two distinct native names to store a particular volume of data, making the other native names that correspond to the same logical volume as the first of the at least two distinct native names unavailable for assignment by non-path aware entities in the mapping layer.

23. A host computer for use in a computer system including the host computer, a storage system and a plurality of paths coupling the host computer to the storage system, the storage system storing a plurality of logical volumes, the plurality of logical volumes including at least one logical volume that is accessible to the host computer over at least two of the plurality of paths, the host computer comprising:

a mapping layer that assigns the plurality of logical volumes to store particular volumes of data, the mapping layer including at least one of a file system, a logical volume manager and a database manager; and at least one controller that:

adopts at least two distinct native names for the at least one logical volume, each of the native names corresponding to one of the at least two of the plurality of paths over which the at least one logical volume is accessible to the host computer;

adopts at least one pseudoname for the at least two distinct native names, the at least one pseudoname representing the at least one logical volume in a manner that is independent of the at least two of the plurality of paths over which the at least one logical volume is accessible to the host computer; and makes the at least one pseudoname and the at least two native names directly available to the mapping layer for assignment to store a volume of data, so that the mapping layer can assign the at least one logical volume to store a particular volume of data by:

assigning the at least one pseudoname to store the particular volume of data so that I/O requests from the mapping layer to access the at least one logical volume identify the at least one logical volume using the at least one pseudoname; or directly assigning either of the at least two native names to store the particular volume of data so that I/O requests from the mapping layer to access the at least one logical volume identify the at least one logical volume using either of the at least two native names.

24. The host computer of claim 23, wherein the at least one controller adopts a single pseudoname for the at least two distinct native names.

25. The host computer of claim 23, wherein the mapping layer includes at least one non-path aware entity that is incapable of determining that the at least two native names correspond to a same logical volume, and wherein the at least one controller makes the at least two native names available to the at least one non-path aware entity for assignment to store a volume of data.

26. The host computer of claim 23, wherein the at least one controller adopts a pseudoname that identifies the at least one logical volume in a manner that is independent of a physical configuration of the computer system.

27. The host computer of claim 23, wherein:

the at least one controller adopts a plurality of native names, the plurality of native names including a set of distinct native names for each of the plurality of logical volumes that is accessible to the host computer over multiple paths;

the at least one controller adopts a plurality of pseudonames, the plurality of pseudonames including a pseudoname for each set of distinct native names;

the mapping layer includes at least first and second mapping entities;

the first mapping entity assigns a first subset of the plurality of logical volumes to store a first group of volumes of data by assigning at least some of the plurality of pseudonames to store the first group of volumes of data; and the second mapping entity assigns a second subset of the plurality of logical volumes to store a second group of volumes of data by assigning at least some of the plurality of native names to store the second group of volumes of data.

28. The host computer of claim 23, wherein the at least one controller, in response to the computer system being reconfigured so that the at least one logical volume is no longer accessible to the host computer over one of the at least two paths, continues to make available to the mapping layer the native name corresponding to the one of the at least two paths over which the at least one logical volume is no longer available.

29. The host computer of claim 23, wherein the at least one controller routes an input/output (I/O) command directed to the at least one pseudoname from the processor to the storage system over one of the at least two paths.

30. The host computer of claim 23, wherein the at least two distinct native names include a first native name corresponding to a first of the at least two paths and a second native name corresponding to a second of the at least two paths, and wherein the at least one controller routes input/output (I/O) commands directed to the first native name from the processor to the storage system over both of the at least two paths.

31. The host computer of claim 23, wherein the at least one controller adopts a logical connection between the at least two distinct native names, the logical connection identifying the at least two distinct native names as corresponding to a same logical volume.

32. The host computer of claim 31, wherein the at least one controller prevents the mapping layer from assigning the at least two distinct native names to store different volumes of data.

33. The host computer of claim 32, wherein the at least one controller, in response to the mapping layer assigning a first of the at least two distinct native names to store a particular volume of data, makes the other native names that correspond to the same logical volume as the first of the at least two distinct native names unavailable for assignment by non-path aware entities in the mapping layer.

34. The host computer of claim 23, wherein the at least one controller includes:

means for adopting at least two distinct native names for the at least one logical volume, each of the native names corresponding to one of the at least two of the plurality of paths over which the at least one logical volume is accessible to the host computer;

means for adopting a pseudoname for the at least two distinct native names, the pseudoname representing the at least one logical volume in a manner that is independent of the at least two of the plurality of paths over which the at least one logical volume is accessible to the host computer; and means for making the pseudoname and the at least two native names available to the mapping layer for assignment to store a volume of data, so that the mapping layer may assign the at least one logical volume to store a particular volume of data by assigning the pseudoname or either of the at least two native names to store the particular volume of data.

35. A method of managing a plurality of logical volumes in a computer system, the computer system including a processor, a storage system, and a plurality of paths coupling the processor to the storage system, the storage system storing the plurality of logical volumes, the processor including a mapping layer including at least first and second mapping entities that each assigns at least a subset of the plurality of logical volumes to store particular volumes of data, each of the mapping entities including at least one of a file system, a logical volume manager and a database manager, each of the plurality of logical volumes being accessible to the processor over at least two of the plurality of paths, each one of the plurality of logical volumes having a corresponding set of native names including a distinct native name for each of the plurality of paths over which the one of the plurality of logical volumes is accessible to the processor, each set of native names having a pseudoname that represents the corresponding logical volume in a manner that is independent of any of the plurality of paths over which the corresponding logical volume is accessible to the processor, the sets of native names collectively forming a plurality of native names that represent the plurality of logical volumes, the pseudonames for the sets of native names collectively forming a plurality of pseudonames that represent the plurality of logical volumes, the method comprising acts of:

(A) the first mapping entity assigning a first subset of the plurality of logical volumes to store a first group of volumes of data by assigning at least some of the plurality of pseudonames to store the first group of volumes of data so that input/output (I/O) requests from the first mapping entity to access at least a first logical volume of the first subset identify the at least one logical volume using the at least one pseudoname; and (B) the second mapping entity assigning a second subset of the plurality of logical volumes to store a second group of volumes of data by assigning at least some of the plurality of native names directly, rather than through a corresponding psuedoname, to store the second group of volumes of data so that (I/O) requests from the second jmapping entity to access at least a second logical volume of the second subset identify the at least second logical volume using either of the at least two native names.

36. The method of claim 35, wherein the second mapping entity is a non-path aware entity that is incapable of determining which of the plurality of native names form a set corresponding to a same logical volume, and wherein the act (B) includes an act of the non-path aware entity assigning the second subset of the plurality of logical volumes to store the second group of volumes of data by assigning at least some of the plurality of native names to store the second group of volumes of data.

37. The method of claim 35, further including an act of:

(D) preventing the second mapping entity from assigning any two native names within a set of native names to store different volumes of data.

38. The method of claim 37, wherein the act (D) includes an act of, in response to the second mapping entity assigning a native name in a first set of native names to store a particular volume of data, making the other native names in the first set unavailable for assignment by non-path aware entities in the mapping layer.

39. A host computer for use in a computer system including the host computer, a storage system, and a plurality of paths coupling the host computer to the storage system, the storage system storing a plurality of logical volumes, each of the plurality of logical volumes being accessible to the host computer over at least two of the plurality of paths, each one of the plurality of logical volumes having a corresponding set of native names including a distinct native name for each of the plurality of paths over which the one of the plurality of logical volumes is accessible to the host computer, each set of native names having a pseudoname that represents the corresponding logical volume in a manner that is independent of any of the plurality of paths over which the corresponding logical volume is accessible to the host computer, the sets of native names collectively forming a plurality of native names that represent the plurality of logical volumes, the pseudonames for the sets of native names collectively forming a plurality of pseudonames that represent the plurality of logical volumes, the host computer comprising:

a first mapping layer including at least first and second mapping entities that each assigns at least a subset of the plurality of logical volumes to store particular volumes of data, the first and second mapping entities each including one of a file system, a logical volume manager and a database manager; and a multi-path mapping layer than can accept input/output (I/O) requests from the first mapping layer to access the plurality of logical volumes and select one of the plurality of paths to process each request;

wherein the first mapping entity is operable to assign a first subset of the plurality of logical volumes to store a first group of volumes of data by assigning at least some of the plurality of pseudonames to store the first group of volumes of data so that I/O requests from the first mapping entity to access at least a first logical volume of the first subset identify the at least one logical volume using the at least one pseudoname; and wherein the second mapping entity is operable to assign a second subset of the plurality of logical volumes to store a second group of volumes of data by assigning at least some of the plurality of native names to store the second group of volumes of data so that I/O requests from the second mapping entity to access at least a second logical volume of the second subset identify the at least second logical volume using either of the at least two native names.

40. The host computer of claim 39, wherein the second mapping entity is a non-path aware entity that is incapable of determining which of the plurality of native names form a set corresponding to a same logical volume.

41. The host computer of claim 39, further including at least one controller that prevents the second mapping entity from assigning any two native names within a set of native names to store different volumes of data.

42. The host computer of claim 41, further including at least one controller that, in response to the second mapping entity assigning a native name in a first set of native names to store a particular volume of data, makes the other native names in the first set unavailable for assignment by any non-path aware entity in the first mapping layer.

* * * * *